United States Patent [19]

MacMillan

[11] 4,271,464
[45] Jun. 2, 1981

[54] SWITCHING ARRANGEMENT FOR THE INPUT OF INTERRUPT COMMANDS AND THE OUTPUT OF INTERRUPT ACKNOWLEDGMENT FOR COMPUTER SYSTEMS

[75] Inventor: Richard W. MacMillan, Kolbermoor, Fed. Rep. of Germany

[73] Assignee: Siemens Aktiengesellschaft, Berlin & Munich, Fed. Rep. of Germany

[21] Appl. No.: 947,111

[22] Filed: Sep. 29, 1978

[30] Foreign Application Priority Data

Sep. 30, 1977 [DE] Fed. Rep. of Germany ....... 2744111

[51] Int. Cl.³ .......................... G06F 3/04; G06F 9/00
[52] U.S. Cl. .................................................. 364/200
[58] Field of Search ... 364/200 MS File, 900 MS File; 340/147 LP

[56] References Cited

U.S. PATENT DOCUMENTS

| 3,800,287 | 3/1974 | Albright | 364/200 |
|---|---|---|---|
| 3,866,181 | 2/1975 | Gayman et al. | 364/200 |
| 3,886,524 | 5/1975 | Appelt | 364/200 |
| 3,993,981 | 11/1976 | Cassarino, Jr. et al. | 364/200 |
| 4,003,028 | 1/1977 | Bennett et al. | 364/200 |
| 4,096,569 | 6/1978 | Barlow | 364/200 |
| 4,148,011 | 4/1973 | McLagan et al. | 340/147 LP |

*Primary Examiner*—Melvin B. Chapnick
*Attorney, Agent, or Firm*—Hill, Van Santen, Steadman, Chiara & Simpson

[57] ABSTRACT

In order to provide an interrupt command signal in a computer and receive an interrupt acknowledgment at a single input/output terminal, an interrupt command encoder includes an inverter for receiving an interrupt command at a first logic level and providing the interrupt command at a second logic level to the single input/output terminal. An interrupt command logic circuit responds to the interrupt command to produce an interrupt signal to the computer which, in turn, is fed back to the single input/output terminal as an interrupt acknowledgment signal of the first logic level. A gate connected to the interrupt command input and to the single input/output terminal is responsive to the interrupt acknowledgment signal of the first logic level only to provide a corresponding signal acknowledging that the computer has received the interrupt signal.

8 Claims, 1 Drawing Figure

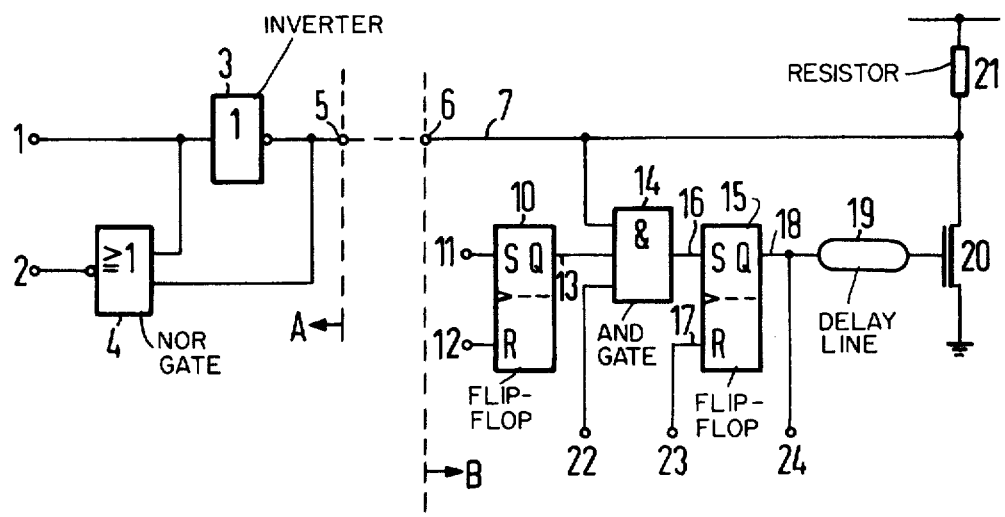

SWITCHING ARRANGEMENT FOR THE INPUT OF INTERRUPT COMMANDS AND THE OUTPUT OF INTERRUPT ACKNOWLEDGMENT FOR COMPUTER SYSTEMS

BACKGROUND OF THE INVENTION

1. Field of the Invention

The present invention relates to a switching arrangement for the input of interrupt signals and the output of interrupt acknowledgments by way of a single connection of an interrupt command logic of a computer system, and more particularly to a microcomputer system in which the logic staticizes an interrupt command as a function of signals which permit an interrupt in the computer system.

2. Description of the Prior Art

The techniques of producing microcomputer architectures as integrated switching circuits are already known, whereby a complete microcomputer with an arithmetic unit, program and data memories, input and output circuits, as well as a clock generator, are integrated on a semiconductor chip.

In providing such a construction, an essential problem resides in the design of a microcomputer structure in such a manner that a housing may be used which has the lowest possible number of terminals.

In particular, the greater the number of terminals of the housing, the more complex and, therefore, more expensive the housing becomes. With an increasing number of terminals or with the use of a housing which is not common in the industry, it can even be possible that the expenditure and, therefore, the cost of the housing is great with respect to the total cost of the integrated microcomputer system. Normally, it would be requisite for interrupt programs to provide a connection, respectively, for the input of interrupt commands as well as for the output of interrupt acknowledgments. With such a construction, the interrupt routine alone would require two housing terminals.

It is known in the art to provide a software-type solution in order to avoid a plurality of connections for interrupt routines. For this purpose, another connection can be optionally utilized for more than one function, whereby the interrupt acknowledgment is output by way of this connection. This technique, however, represents a limitation of connections already present, a certain software expenditure and an inconvenience for the programmer.

SUMMARY OF THE INVENTION

The object of the present invention is to provide a solution to the aforementioned problem in which the interrupt signals and the interrupt acknowledgments can be input into the microcomputer by way of a connection or output from the microcomputer, respectively.

This object is achieved in a switching arrangement of the type mentioned above in that a branch is provided that inverts an interrupt command in an interrupt command encoder which is connected to the single connection. The connection is attached to a controllable switch branch which is, in turn, connected to the output of the interrupt command logic and becomes conductive as a function of a staticized interrupt command whereupon the logical interrupt command level is switched to the logic level before (or preceding) the inverter branch, and in that in the interrupt command encoder a switched gate is provided with an input before (or preceding) the inverter branch and with a further input at the connection to deliver an interrupt acknowledgment as an output signal at the connection, given the electrical level switched through the controllable switch branch.

According to a feature of the invention, following the interrupt command logic, an initial flip-flop is provided whose set input can be activated for acceptance of an interrupt command by means of a control signal and whose reset input can be activated for blocking of an interrupt command by means of a control signal, and a gate is provided which has three inputs which are connected to the connection mentioned above, to the output of the first flip-flop, and to a point for the input of a start signal for the release of an interrupt process which is generated at the end of a running operation in a computer. A second flip-flop has a set input connected to the output of the gate, and a reset input connected to the aforementioned point for receiving the start signal for indicating the end of an interrupt process and an output connected to the controllable switch branches.

According to a further feature of the invention, the controllable switch branch comprises a switching transistor, particularly an MOS transistor, which is activated from the output of the second flip-flop and a load branch. The aforementioned connection is connected at the junction between the switching transistor and the load branch so that the logic level of the connection is drawn, in response to activation of the switching transistor, to the level before (or preceding) the inverter branch of the interrupt command generator.

According to another feature of the invention, the interrupt command generator includes a gate which is constructed as a NOR gate.

According to another feature of the invention, the inverter branch contains an open collector or open drain inverter.

BRIEF DESCRIPTION OF THE DRAWING

Other objects, features and advantages of the invention, its organization, construction and operation will be best understood from the following detailed description, taken in conjunction with the accompanying drawing, on which there is a single FIGURE which is a logic circuit diagram of an exemplary embodiment of a switching arrangement constructed in accordance with the present invention.

DESCRIPTION OF THE PREFERRED EMBODIMENT

Referring to the drawing, an interrupt command generator is illustrated on the left-hand side of the drawing and is separated from the remaining circuit by the broken line indicated at the arrow A. On the right-hand side of the broken-line, indicated by an arrow B, an interrupt command logic is illustrated.

In the interrupt command generator, an interrupt command is input at an input 1, the command being defined in the present exemplary embodiment by a low level or a logical "0", respectively. The interrupt command is inverted by an inverter 3 and appears at an output 5 as a logic "1". The inverter 3 must be constructed either as an open collector or open drain inverter. Through this technique, a logic "1" is provided at an input 6 and on a circuit line 7 of the interrupt command logic.

An AND gate 14 has a first input connected to the line 7. In the interrupt command logic, also, an initial flip-flop 10 is provided which has an output 13 connected to a second input of the AND gate 14. The flip-flop 10 is settable at a set input 11 by means of a control signal which is delivered by the computer system in order that an interrupt command residing on the line 7 can be staticized in the interrupt command logic. At a third input of the AND gate 14, which is connected to a terminal 22, a start signal may be input, the start signal being generated after completion of a running operation in the computer. When, therefore, the flip-flop 10 is set by way of its set input 11 so that its output 13 delivers a signal, and when the start signal is present at the terminal 22, then an interrupt command on the line 7 can be switched through to an output 16 of the AND gate 14. The output 16 is connected to a set input S of a further flip-flop 15, so that upon setting of the flip-flop 15 an interrupt command is acknowledged. The interrupt command then appears at an output 18 of the flip-flop 15 and is input into the computer sequence control at a terminal 24.

Further, the interrupt of command applied at the output 18 is delivered to the gate of a metal-oxide-semiconductor (MOS) transistor 20 by way of a delay line 19. The transistor 20 constitutes, together with a resistor 21, a switch branch. By means of the interrupt command, the line 7 is drawn toward ground potential, so that a logic "0" now resides on the line 7 and, thus, at the output 5 of the interrupt command encoder or generator. This logic "0" is input into an input of a NOR gate 4 whose other input receives the logic "0" from the input 1. Therefore, a logic "1" appears at the output 2 of the NOR gate 4 as an interrupt acknowledgment.

From the foregoing, it therefore follows that the inputs of an interrupt command, as well as the outputs of an interrupt acknowledgment can be provided over the single connection 6 of the interrupt command logic.

By means of a reset input 12 of the flip-flop 10, an interrupt can be inhibited by means of a control signal input at this point, so that the flip-flop 10 is then reset and the AND gate 14 is blocked by way of the output 13.

Upon abandonment of an interrupt program, the flip-flop 15 can be reset at a reset input 17 from a terminal 23 by means of an appropriate control signal, so that an interrupt command is no longer present at the terminal 24.

The delay line 19 guarantees a secure acceptance of an interrupt command, so that the setting of the flip-flops is not prevented by a premature engagement of the MOS transistor 20.

Although I have described my invention by reference to a particular illustrative embodiment thereof, many changes and modifications of the invention may become apparent to those skilled in the art without departing from the spirit and scope thereof. I therefore intend to include within the patent warranted hereon, all such changes and modifications as may reasonably and properly be included within the scope of my contribution to the art.

I claim:

1. A switching arrangement for a computer system for receiving interrupt command signals and providing interrupt acknowledgment signals over a common line having a single input/output terminal, said switching arrangement comprising:

an interrupt generator including an input for receiving an interrupt command signal of a first logic level, an inverter for inverting the interrupt signal to a second logic level, a first output connected to said single input/output terminal of the common line, and a second output;

a controllable switch connected to the common line and including an input; and an interrupt command logic including an input connected to the common line to receive the second logic level, control inputs for receiving control signals to switch through the second logic level, and an output connected to said input of said controllable switch for causing operation of said controllable switch to place an interrupt acknowledgment signal of the first logic level on the common line and at said single input/output terminal, said interrupt generator further including a gate having a first input connected to said input of said interrupt generator, a second input connected to said single input/output terminal of the common line and an output for providing an output signal in response to the interrupt command and interrupt acknowledgment signals.

2. The switching arrangement of claim 1, wherein said interrupt command logic comprises:

a first flip-flop having a set input for receiving a first control signal for activation of said command logic to accept interrupt signals, a reset input for receiving a second control signal for blocking acceptance of interrupt signals, and an output;

an AND gate having a first input connected to said common line, a second input connected to said output of said first flip-flop, a third input for receiving a third control signal as a start signal generated at the end of a running process by a computer, and an output; and a second flip-flop having a set input connected to said output of said AND gate, a reset input for receiving a fourth control signal generated by the computer to indicate the end of an interrupt process, and an output coupled to said input of said controllable switch.

3. The switching arrangement of claim 1, wherein said controllable switch comprises:

a switching transistor having an input coupled to said output of said interrupt command logic; and a load connected to said switching transistor with the junction of said switch transistor and said load connected to said common line.

4. The switching arrangement of claim 3, comprising:

a delay element interposed between said output of said interrupt command logic and said input of said switching transistor.

5. The switching arrangement of claim 3, wherein said switching transistor is a metal-oxide-semiconductor transistor.

6. The switching arrangement of claim 1, wherein said interrupt generator comprises:

a NOR gate having a first input connected to said input of said interrupt generator to receive interrupt command signals, a second input connected to said common line to receive acknowledgment signals, and an output for indicating proper transmission and receipt of the interrupt signals.

7. The switching arrangement of claim 1, wherein said inverter is constructed as an open collector inverter.

8. The switching arrangement of claim 1, wherein said inverter is constructed as an open drain inverter.

* * * * *